US008391710B2

(12) United States Patent
Heimlicher et al.

(10) Patent No.: US 8,391,710 B2
(45) Date of Patent: Mar. 5, 2013

(54) OPTICAL SENSOR SYSTEM, OPTICAL SENSOR DEVICE AND BUS SEGMENT FOR CONNECTING THE DEVICE TO A BUS OF THE SYSTEM

(75) Inventors: Peter Heimlicher, Fribourg (CH); Charles Rhême, Posieux (CH); Pierre-Yves Dénervaud, Villars-sur-Glâne (CH); Roland Bochud, Noréaz (CH)

(73) Assignee: Optosys SA (CH)

( * ) Notice: Subject to any disclaimer, the term of this patent is extended or adjusted under 35 U.S.C. 154(b) by 715 days.

(21) Appl. No.: 12/553,399

(22) Filed: Sep. 3, 2009

(65) Prior Publication Data

US 2010/0061723 A1 Mar. 11, 2010

(30) Foreign Application Priority Data

Sep. 5, 2008 (EP) .................................. 08405215

(51) Int. Cl.
*H04B 10/20* (2006.01)
*H04B 10/00* (2006.01)
(52) U.S. Cl. ........... 398/60; 398/107; 398/108; 398/154
(58) Field of Classification Search .............. 398/58–64, 398/106–117, 135–139, 154; 307/42, 32, 307/117; 356/4.01
See application file for complete search history.

(56) References Cited

U.S. PATENT DOCUMENTS 5,818,123 A * 10/1998 Iwasaki et al. .................. 307/42
2008/0174450 A1 7/2008 Tanizawa

OTHER PUBLICATIONS

European Search Report dated Mar. 10, 2009, issued in corresponding priority European application No. EP 08 40 5215.

* cited by examiner

*Primary Examiner* — Kenneth N Vanderpuye
*Assistant Examiner* — Daniel Dobson
(74) *Attorney, Agent, or Firm* — Ostrolenk Faber LLP

(57) ABSTRACT

An optical sensor system comprises one or more optical sensor devices, a master device and an electrical bus connecting the sensor devices to the master device. The bus comprises a signal daisy chain for the transmission of synchronization events. The sensor devices are adapted to detect a synchronization event at a signal input terminal, to time an optical activity based on this synchronization event and to provide at a signal output terminal a synchronization event delayed by an offset time with respect to the detected synchronization event. A property of the synchronization events provided by the sensor devices is indicative of an output value of the respective sensor device, corresponding to a state of an optical section to which the sensor is sensitive. Diodes are connected between the signal output terminals of the sensor devices and a signal line of the bus, which is connected to a signal input terminal of the master device, so that the latter receives the synchronization events from the sensor devices. The master device comprises means for extracting the output values of the sensor devices from these synchronization events. A sensor device for such a system comprises an enclosure of cuboid outer shape adapted to be mounted to a mounting rail so that the longitudinal direction of the rail is perpendicular to lateral sides of the enclosure. An electrical connector with the signal input and output terminals and with power supply terminals is arranged at a side connecting the lateral sides of the enclosure. Bus segments are provided for connecting the sensor devices to the system bus.

13 Claims, 4 Drawing Sheets

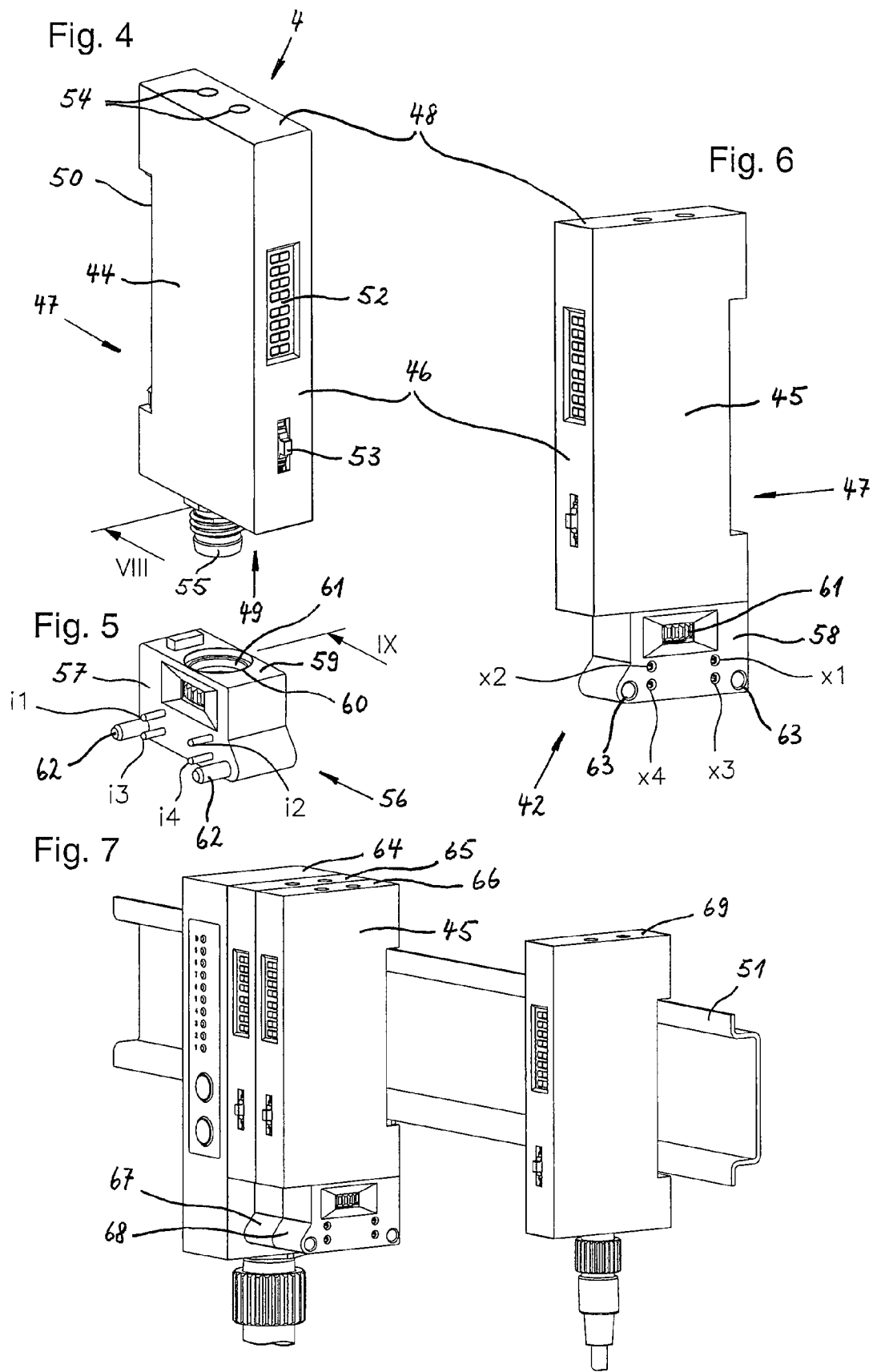

US 8,391,710 B2

OPTICAL SENSOR SYSTEM, OPTICAL SENSOR DEVICE AND BUS SEGMENT FOR CONNECTING THE DEVICE TO A BUS OF THE SYSTEM

BACKGROUND OF THE INVENTION

The invention relates to an optical sensor system, an optical sensor device for a sensor system and a bus segment for connecting a sensor device to a bus of a sensor system.

The U.S. Pat. No. 5,818,123 discloses an optical sensor system with optical sensor devices which are connectable to optical head sections by means of optical fibers. Each sensor device comprises an electrooptical transmitter for sending light into a first optical fiber, an electrooptical receiver for detecting light received through a second optical fiber and means for determining an output value indicative of a state of an optical section between the transmitter and the receiver. In order to prevent optical interference between the sensor devices, the optical activities of their transmitters are synchronized: Each sensor device has a signal input for receiving synchronization pulses and a signal output for providing synchronization pulses to a succeeding sensor device: the signal input and output terminals of the sensor devices are connected in pairs according to a daisy chain pattern. An electrical bus of the system comprises this signal daisy chain, as well as power supply lines.

SUMMARY OF THE INVENTION

A first object of the invention is to provide a sensor system in which the sensor devices can transmit their output values to the master device with minimal time lag.

A second object of the invention is to reduce the cost of making an optical sensor device adapted to be synchronized with further sensor devices of a sensor system.

These objects are achieved with an optical sensor system, with an optical sensor device and with a bus segment for connecting an optical sensor device to a bus of a sensor system.

In a preferred embodiment, the sensor system comprises sensor devices which are preferably connected to a master device of the system by means of bus segments.

The invention is described in detail hereafter with reference to the preferred embodiment represented in the appended drawings.

BRIEF DESCRIPTION OF THE DRAWINGS

FIG. 4 shows in perspective view a sensor device for a system according to claim 1;

FIG. 5 shows a bus segment for the connection of the sensor device of FIG. 4 to the bus of the sensor system;

FIG. 6 shows a sensor unit consisting of the sensor device of FIG. 4 and the bus segment of FIG. 5;

FIG. 7 shows a mounting rail with a sensor system comprising sensor devices according to FIG. 6, and with a sensor device according to FIG. 4 connected for stand-alone use;

DESCRIPTION OF PREFERRED EMBODIMENTS

Figure 1:
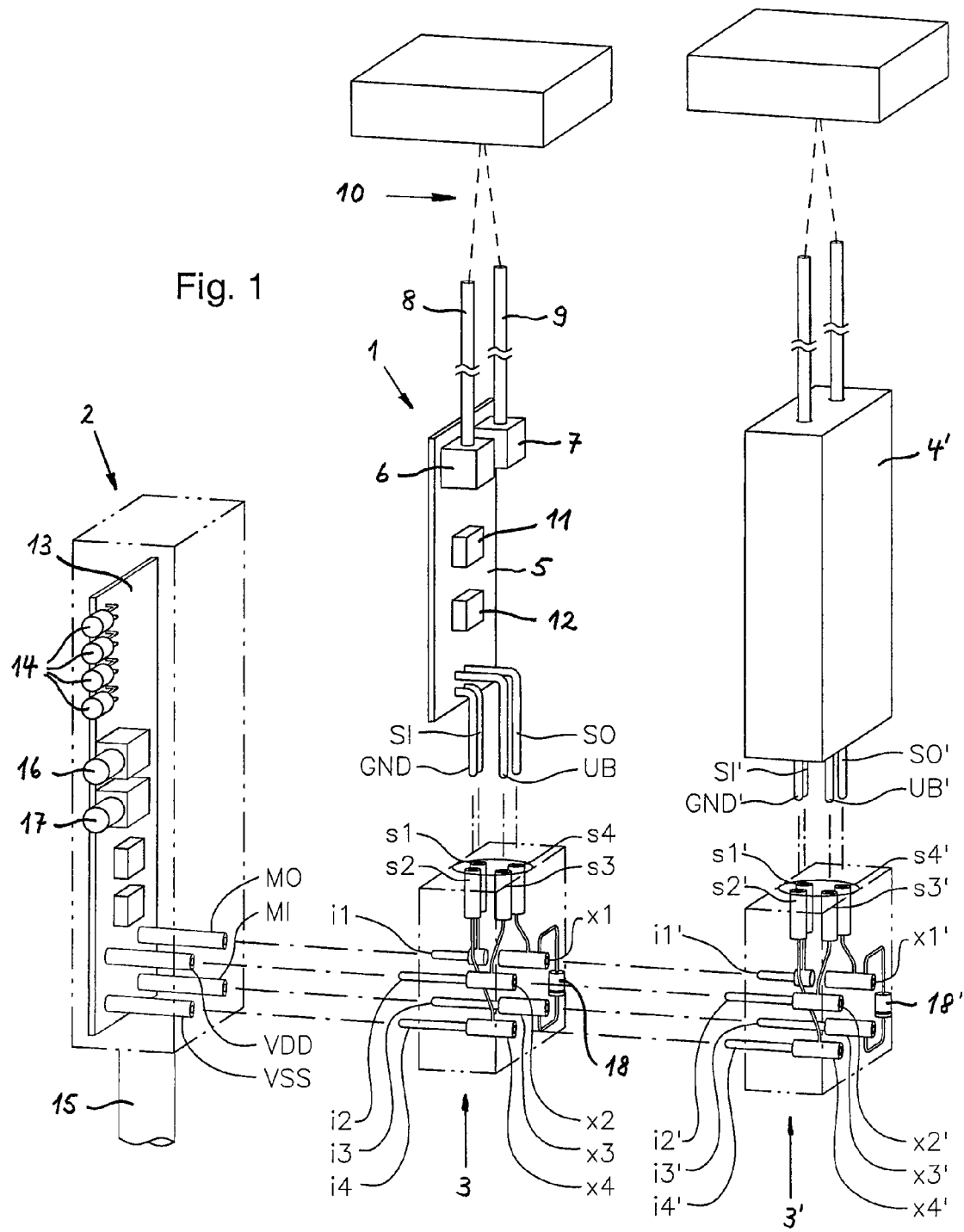
FIG. 1 shows in an exploded, perspective view the simplified representation of a sensor system comprising a master device, two sensor devices and two bus segments.

FIG. 1 shows in exploded view an optical sensor system comprising two sensor devices 1, 1' which are connected to a master device 2 by means of bus segments 3, 3'. The two sensor devices 1, 1' are identical: any features described hereafter with reference to one sensor device 1, apply to the other sensor device 1' as well. Each of them has an enclosure 4' (not shown for the first sensor device 1) and a sensor circuit with a printed circuit board 5 arranged within the enclosure.

The sensor circuit comprises an electrooptical transmitter 6 and an electrooptical receiver 7, and is adapted to determine an output value indicative of a state of an optical section between the transmitter 6 and the receiver 7. Optical fibers 8, 9 are connected to the transmitter 6 and to the receiver 7 respectively and the optical section further comprises a head section 10 between the remote ends of the optical fibers 8, 9. The functionality of the sensor device, which is described with reference to FIG. 2 hereafter, is preferably implemented in a computer program, which is stored in a memory device 11 and executed by a microprocessor 12. Connection terminals of the sensor circuit include a signal input terminal SI, a signal output terminal SO and two power supply terminals GND, UB.

The master device 2 comprises a master circuit with a printed circuit board 13 arranged within an enclosure indicated by dash-dotted lines. This circuit has a bus interface with two power supply terminals VSS, VDD, a signal output terminal MO and a signal input terminal MI, which is connected to the sensor devices 1, 1' by means of an electrical bus. Using the transmission protocol described with reference to FIG. 2 hereafter, the master device 2 is able to send synchronization information to the sensor devices and to receive output value information from the same. An output value display in the form of light diodes 14 displays the output values of the sensor devices and a master cable 15 is connected to a parallel signal interface of the master device 2 for the transmission of sensor output value signals to a control unit. The master circuit further comprises a reset button 16 for resetting the sensor devices 1, 1' and a command button 17 for sending a special command to the sensor devices (see FIG. 2).

Instead of the parallel signal interface, or in addition to it, the master circuit may comprise a serial data interface and serve as a communication interface between the sensor devices and the control unit or any other user system. This communication interface is preferably compliant with the IO-Link standard and may enable the connected user system to remotely trigger a reset command or to sequentially access the output values of the sensor devices.

The electrical bus is formed by the bus segments 3, 3', each of which is individually associated with one of the sensor devices 1, 1'. Each bus segment comprises sensor side connection terminals s1-14, s1'-s4' for mating with the connection terminals of the respective sensor device 1, 1', as well as input side connection terminals i1-i4, i1'-i4' and output side connection terminals x1-x4, x1'-x4'. The bus segments are arranged in a row extending from the master device, which is arranged at a front end of the row. In the assembled state, the connection terminals MO, VDD, MI, VSS of the bus interface of the master device 2 are mated with corresponding input side connection terminals i1-i4 of the first bus segment 3 and each of the output side connection terminals x1-x4 of this bus segment 3 is mated with the input side connection terminal i1'-i4' of the succeeding bus segment 3' corresponding to its associated input side connection terminal i1-i4.

The wiring topology of the bus formed by the bus segments 3, 3' will now be described: The signal output terminal MO of the master device 2 and the signal input and output terminals SI, SO, SI', SO' of the sensor devices 1, 1' are connected in pairs according to a daisy chain pattern, forming a signal daisy chain of the bus. The signal input terminal MI of the master device 2 is connected to a signal line of the bus and diodes 18, 18' are connected between the signal output terminals SO, SO' of the sensor devices 1, 1' and this signal line, so that signal events produced by the sensor devices 1, 1' at their signal output terminals SO, SO' are transmitted over the signal line to the master device 2. Finally, the power supply terminals VDD, VSS are connected to corresponding power supply terminals UB, GND, UB', GND' of the sensor devices 1, 1' by power supply lines of the bus.

Each bus segment 3, 3' comprises a segment of the bus, including a segment of the signal daisy chain and segments of the bus lines. Referring to the first bus segment 3 only, the segment of the signal daisy chain consists of a pair of mutually associated input and output side connection terminals i1, x1, of which the former (the input side connection terminal i1) is connected to a sensor side connection terminal s1 for mating with the signal input terminal SI of the sensor device and the latter (the output side connection terminal x1) is connected to a sensor side connection terminal s4 for mating with the signal output terminal SO of the sensor device. The line segments consist of interconnected pairs of mutually associated input and output side connection terminals i2, x2; i3, x3; i4, x4 and include segments i2, x2; i4, x4 of the power supply lines, which are connected to sensor side connection terminals s3, s2 for mating with power supply terminals UB, GND of the respective sensor device, as well as a segment i3, x3 of the signal line. The diode 18 is part of the bus segments 3 and connected between the output side connection terminal x1 of the daisy chain segment (which is connected to the signal output terminal SO of the sensor device 1 in the assembled state) and the signal line i3, x3 of the respective bus segment. The succeeding bus segment 3' has the same structure as the first bus segment 3.

Figure 2:
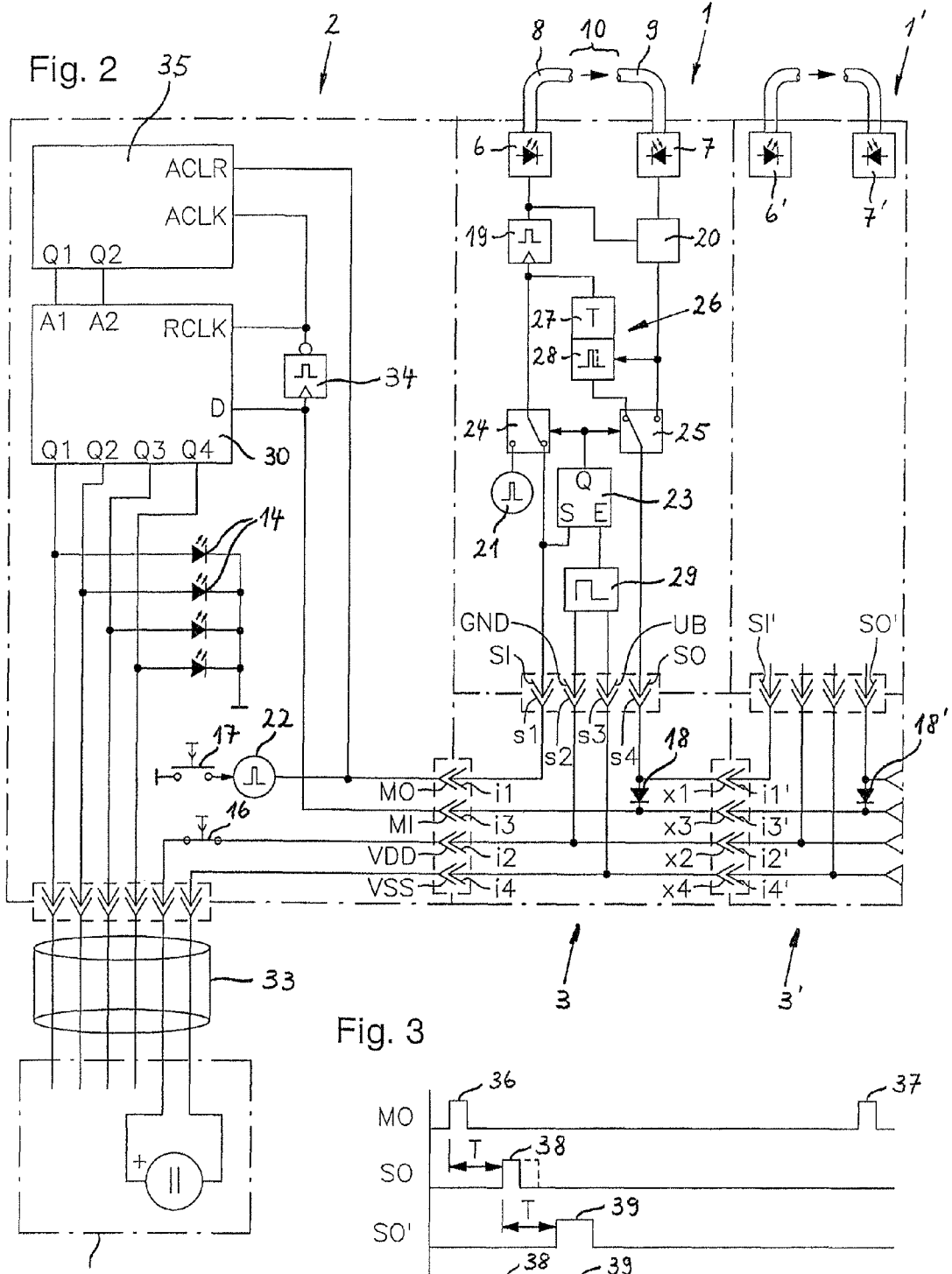
FIG. 2 is the simplified circuit diagram of a sensor system according to FIG. 1.

FIG. 2 shows the simplified circuit diagram of a sensor system according to FIG. 1. The dash-dotted lines delimit portions of the circuit belonging to individual devices of the system, i.e. the sensor devices 1, 1', the master device 2 and the bus segments 3, 3'. The circuit of the second sensor device 1' is identical to the one of the first sensor device 1.

The circuit of the sensor device 1 comprises a monostable multivibrator 19, also called mono-flop hereafter, the output of which drives the electrooptical transmitter 6, so that the transmitter sends light into the optical fiber 8 during a limited period of time each time the mono-flop 19 is triggered. The output of receiver 7 is connected to the input of an evaluation unit 20 adapted to evaluate an output signal of the receiver 7 and to determine an output value indicative of a state of an optical section 10 between the transmitter 6 and the receiver 7. The determined output value is represented by the voltage level of an output signal of evaluation unit 20. In this example the sensor device 1 is an optical switch with only two possible output values, so that the output signal of evaluation unit 20 is digital.

The sensor device has different modes of operation, including a mode for stand-alone operation and a mode for operation in a sensor system. In stand-alone mode the mono-flop 19 is triggered periodically by pulses generated by an internal pulse generator 21, whereas it is triggered by synchronization pulses generated by a pulse generator 22 of the master device 2 in system mode. These are provided at the signal output terminal of the master device MO, which is connected to the signal input terminal SI of the first sensor device.

The operating mode of the sensor device is determined by the state of a latch 23, which is reset in stand-alone mode and set in system mode. The output of the latch 23 controls the state of a switch 24, which connects the trigger input of mono-flop 19 to the output of the internal pulse generator 21 in stand-alone mode and to the signal input terminal SI of the sensor device in system mode. A further switch 25, the state of which is controlled by the output of latch 23 as well, connects the signal output terminal SO of the sensor device to the output of the evaluation unit 20 in stand-alone mode and to the output of a synchronization pulse processing unit 26 in system mode. FIG. 2 shows the two switches 24, 25 in their states in system mode.

The synchronization pulse processing unit 26 comprises a delay unit 27 for delaying the synchronization pulses occurring at the signal input terminal SI by a predetermined offset time T. It further comprises a pulse width modulator 28 for modulating the width of the delayed synchronization pulse as a function of the output signal of the evaluation unit 20, so that the width of the delayed synchronization pulses provided at the output of the pulse processing unit 26 is indicative of the output value determined by evaluation unit 20. Depending on the level of the digital output signal of evaluation unit 20, the synchronization pulses at the output of pulse processing unit 26 are either wide or narrow, the wide pulses being twice as wide as the narrow pulses. As already mentioned, the output of the pulse processing unit 26 is connected to the signal output terminal SO in system mode and this output terminal SO is connected to the signal input terminal SI' of the succeeding sensor device 1', so that the optical activity of the latter is delayed by the offset time T with respect to the optical activity of the first sensor device 1.

The latch 23 has an S input (set) and an E input (enable). It is reset on power-up, so that the stand-alone mode is the default mode of operation. The S input is connected to the signal input terminal SI and the E input is connected to the output of a power-up detector 29, so that a synchronization pulse supplied to the signal input terminal SI triggers the transition to system mode if it occurs within a limited period of time following power-up. This has the advantage that other functions can be assigned to the signal input terminal SI for stand-alone operation.

The synchronization pulses produced by the sensor devices 1, 1' are transmitted via the diodes 18, 18' and the signal line of the bus to the signal input terminal MI of the master device. The diodes 18, 18' have the function to avoid the transmission of synchronization pulses from the signal line to the signal input terminals SI, SI' of the sensor devices. The master device 2 is adapted to extract the output value information from these pulses and to write it into a register 30 with a parallel output. In this simplified example, the register 30 has four bits Q1-Q4, so that four sensor devices 1, 1' may be connected to this master device 2 at most. Preferably a larger register with 10 bits or more is used, so that at least 10 sensor devices can be connected to the master device. Light emitting diodes 14 display the output values of the sensor devices and the parallel output value signals Q1-Q4 are transmitted from the master device 2 to a remote control unit 32 by means of a cable 33.

To extract the output value information from the synchronization pulses produced by the sensor devices, the signal input terminal MI of the master device is connected to a serial input D of the register 30 and to the trigger input of a mono-flop 34, an inverting output of which is connected to the clock input RCLK of the register 30, so that the register 30 is clocked by the leading edge of each synchronization pulse with a delay with respect to the same corresponding to the return time of the mono-flop 34. A return time of 1.5 times the width of the narrow synchronization pulses ensures that the sensor value transmitted by the respective synchronization pulse is written into the register 30. The bit of the register 30 to which the value is written is addressed by an address counter 35 connected to an address input A1, A2 of the register, which is clocked together with the register (the clock input ACLK of the counter 35 is connected to the clock input RCLK of the register), so that the counter is increased immediately after the registration of an output value. A reset input ACLR of the counter 35 is connected to the output of the pulse generator 22, so that the counter is reset by the synchronization pulses produced by the master device.

Figure 3:
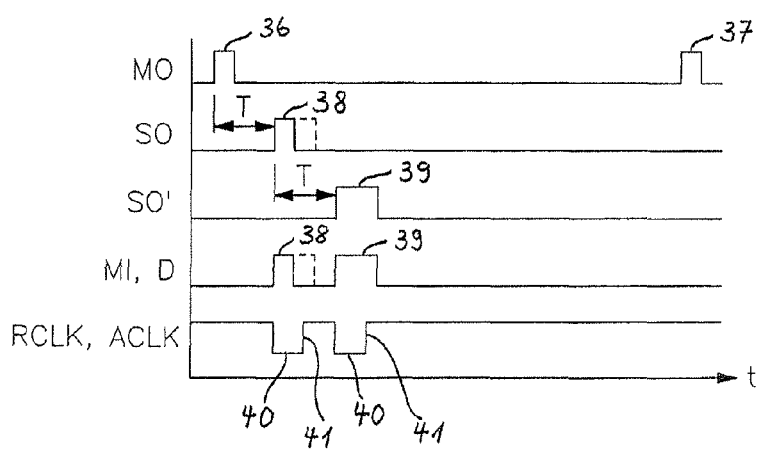
FIG. 3 shows the time history of voltage signals in a circuit according to FIG. 2.

FIG. 3 shows the time history of voltage signals at various points in the circuit of FIG. 2. The pulse generator 22 generates periodic synchronization pulses 36, 37 which are supplied to the signal input SI of the first sensor device 1. Following the detection of such a synchronization pulse 36, this device provides at its signal output terminal SO a synchronization pulse 38 which is delayed with respect to the detected synchronization pulse 36 by an offset time T. The second sensor device 1' operates in the exact same way as the first sensor device 1: it detects the synchronization pulse 38 produced by the device by which it is preceded in the signal daisy chain, and produces itself a synchronization pulse 39 which is delayed by the offset time T with respect to the detected synchronization pulse 38. The time history of the voltage level on the signal line of the bus, which is connected to the signal input MI of the master device 2, corresponds to the result of a logical OR conjunction of the output signals SO, SO' of all the sensor devices: it contains all the synchronization pulses 38, 39 produced by the sensor devices 1, 1'. The inverted pulses 40 in the signal at the clock inputs RCLK, ACLK of the register 30 and of the address counter 35 are triggered by the leading edges of these synchronization pulses 38, 39 and their trailing, rising edges 41 clock the register 30 and the address counter 35, so that the register bit addressed by the counter 35 is set to the value corresponding to the signal level at the serial input D and the counter 35 is increased in order to address the following bit.

As already mentioned, the functionality of most of the circuit components described with reference to FIG. 2 may alternatively be implemented in software executed by a microprocessor. For instance, the mono-flop 19 of the sensor device 1 may be replaced by a computer program adapted to detect a synchronization pulse occurring at the signal input terminal SI and to time an optical activity of the electrooptical transmitter 6 based on this synchronization pulse. Instead of a latch 23, a flag of the microprocessor 11 or storage space of the memory device 12 may be used to set the operating mode of the sensor device. The functions of the switches 24, 25, of the time delay unit 27 and of the pulse width modulator 28 can be implemented in software as well. Last but not least, the function of the evaluation unit 20 is preferably implemented in a computer program. Typically, the evaluation of the output signal of the electrooptical receiver 7 and the determination of the output value based on this evaluation is not just a matter of comparing the receiver signal to a predetermined threshold value, but rather a more complex process (which may involve such a comparison).

A measuring cycle of the sensor devices 1, 1' involves the activation of the transmitter 6 during a limited period of time and the determination of the output value by evaluation of the output signal of the receiver 7 during the same period of time. The time interval between consecutive synchronization pulses 36, 37 produced by the master device, which corresponds to a measuring cycle of the sensor system, should not be much longer than the measuring cycles of the sensor devices. This is possible owing to the direct transmission of the output value modulated synchronization pulses from the sensor devices to the master device.

The offset time T by which synchronization pulses produced by the sensor devices are delayed with respect to corresponding, detected synchronization pulses must be at least as long as the period of optical activity of the transmitters 6, 6' in order to avoid interference, but short enough to ensure that the synchronization pulses 36, 38, 39 propagate to the end of the signal daisy chain, so that the state information of all the sensor devices is transmitted to the master device, before the latter initiates the next measuring cycle of the system.

Instead of synchronization pulses, other electrical synchronization events such as a signal time segment with an identifiable signal pattern may be used as a synchronization event. Such a synchronization event may comprise more than one voltage pulse. In sensor devices with an analog output value, the width of synchronization pulses produced by the sensor device may be a linear function of the output value.

FIGS. 4, 5 and 6 show a sensor device (FIG. 4), a bus segment (FIG. 5) and a sensor unit 42 consisting of the sensor device and the bus segment (FIG. 6). The sensor device has an enclosure of cuboid outer shape, with two parallel lateral sides 44, 45 and with further sides connecting the lateral sides, including a front side 46, a back side 47, a top side 48 and a bottom side 49. The lateral sides 44, 45 are wider than the further sides 46-49, so that the enclosure has the shape of a slice or blade. A recess 50 for mounting the enclosure to a mounting rail 51 (FIG. 7) is provided at the back side 47, a display 52 and a control switch 53 (which are not shown in the diagram of FIG. 2) are provided at the front side 46, apertures 54 for the optical fibers 8, 9 are provided at the top side 48 and an electrical connector 55 is provided at the bottom side 49 of the enclosure. The power supply terminals GND, UB, the signal input terminal SI and the signal output terminal SO of the sensor circuit (FIGS. 1 and 2) are contact members of this electrical connector 55.

The bus segment has an enclosure 56 of cuboid outer shape as well, with two opposite lateral sides 57, 58 and with further sides connecting the lateral sides and including a top side 59, where an aperture 60 is provided, through which the plug connector 55 of the sensor device is matable with a complementary connector arranged within the enclosure of the bus segment. As further described with reference to FIGS. 8-10 hereafter, a coupling ring 61 is provided as a means for attaching the bus segment to the sensor device.

The input side connection terminals are male plug contacts i1-i4 protruding perpendicularly from one lateral side 57 and the output side connection terminals are complementary female plug contacts x1-x4 arranged at the opposite lateral side 58, each in alignment with its associated input side connection terminal i1-i4, so that they are matable with the input side connection terminals i1'-i4' of an identical, further bus segment (see FIG. 1). To mechanically protect the protruding male plug contacts i1-i4, guide pins 62 protrude from the same lateral side 57 beyond the ends of the plug pins i1-i4 and holes 63 provided at the opposite lateral side 58 in alignment with the guide pins 62 are shaped to accommodate the guide pins of the further bus segment.

FIG. 7 shows a mounting rail 51 and, attached to this rail, a sensor system according to FIG. 1 with a master device 64, two sensor devices 65, 66 and two bus segments 67, 68, as well as a further sensor device 69 connected for stand-alone operation. The sensor devices 67, 68 of the sensor system correspond to the sensor device of FIG. 4. The back sides of their enclosures are directed towards the mounting rail 51 and attached to the same, so that the longitudinal direction of the rail 51 is perpendicular to the lateral sides 45 of these enclosures. The further sensor device 69 is identical to the other sensor devices, but operated in stand-alone mode. Alternatively, this sensor device 69 may have a basic sensor circuit capable of stand-alone operation only. Such a basic sensor device has the same enclosure and the same electrical connector 55 like the sensor device of FIG. 4.

Figure 8:
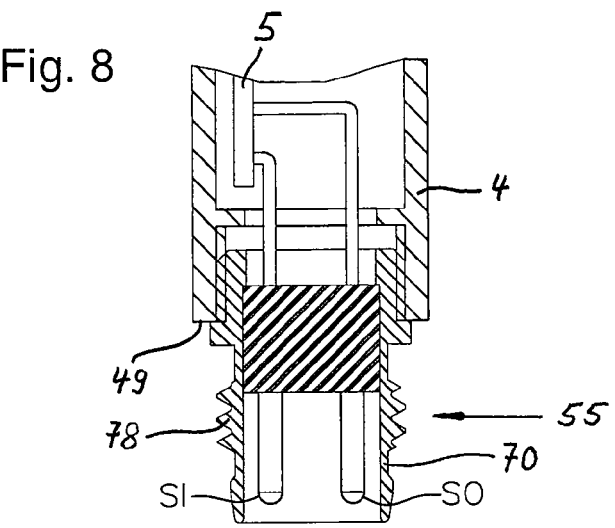
FIG. 8 shows a partial view of the sensor device of FIG. 4 in a cutting plane perpendicular to arrow VIII in FIG. 4 and comprising the point at the tip of this arrow.

FIG. 8 shows a portion of the sensor device of FIG. 4 in sectional view. The connector 55 protrudes perpendicularly from the bottom side 49 of the enclosure 4 and comprises an externally threaded metal sleeve 70 surrounding the four contact pins of the connector (of which only two pins SI, SO are visible in this drawing).

Figure 9:
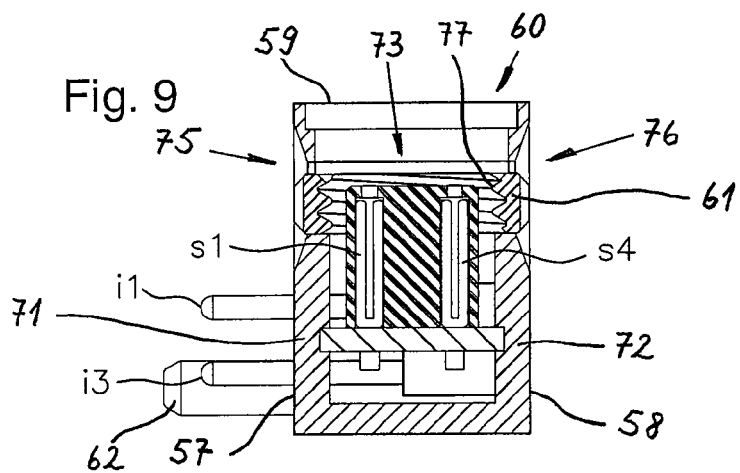
FIG. 9 shows the bus segment of FIG. 5 in a cutting plane perpendicular to arrow IX in FIG. 5 and comprising the point at the tip of this arrow.

FIG. 9 shows the bus segment of FIG. 5 in sectional view. The lateral sides 57, 58 of the cuboid enclosure of the bus segment are formed by side walls 71, 72 of the same and a plug connector 73 is arranged within the enclosure on a circuit board 74 held between these side walls 71, 72. This connector 73 is aligned with and directed towards the opening 60 at the top side 59 of the enclosure, through which it is accessible for mating with the complementary plug connector 55 of the sensor device. The sensor side connection terminals s1-s4 (FIGS. 1 and 2) are plug contacts of this connector (of which only two s1, s4 are visible in this view). The coupling ring 61 is rotatably arranged in alignment with the plug connector 73 and radially protrudes into windows 75, 76 provided in the side walls 71, 72 of the enclosure, so that a user can grip the coupling ring between the thumb and index finger in the area of the windows 75, 76, in order to rotate it. It has an internal thread 77 corresponding to the external thread 78 on the sleeve 70 of the connector 55 of the sensor device.

Figure 10:
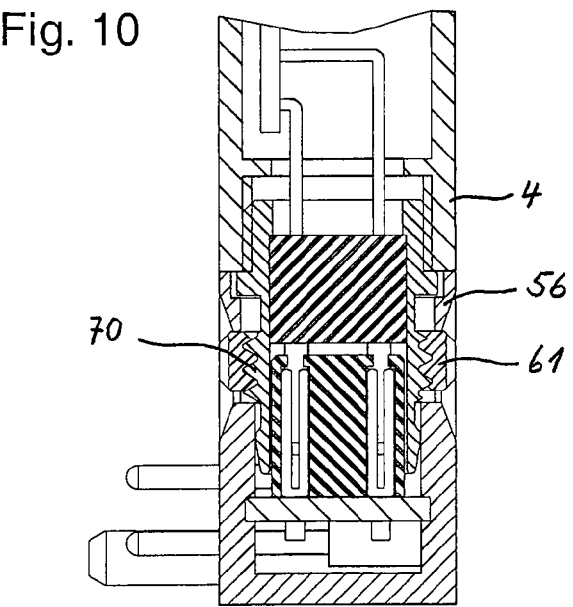
FIG. 10 shows a partial, sectional view of the sensor unit of FIG. 6.

FIG. 10 shows a portion of the sensor unit 42 of FIG. 6 in a cutting plane corresponding to the cutting planes of FIGS. 8 and 9. The plug connector 55 of the sensor device is plugged into the complementary plug connector 73 of the bus segment, so that corresponding contact members of these connectors are mated (see FIGS. 8 and 9 for the reference numerals). The connectors 55, 73 are arranged with respect to the opposed skirt sides of the respective enclosures (the enclosures of the sensor device and of the bus segment, respectively), so that these opposed skirt sides are adjacent in the connected state. The enclosure 56 of the bus segment is held against the enclosure 4 of the sensor device by the coupling ring 61 (the thread of which is engaged with the corresponding thread of the sleeve 70 of the connector of the sensor device), so that two enclosures form a rigid unit of the sensor device. Instead of threads, other coupling means for rotational engagement such as a bayonet joint may be used.

What is claimed is:

1. Optical sensor system comprising one or more optical sensor devices, a master device and an electrical bus connecting the sensor devices to the master device, wherein a signal output terminal of the master device and signal input and output terminals of the sensor devices are connected in pairs according to a daisy chain pattern, forming a signal daisy chain of the bus, each sensor device further comprises an electrooptical transmitter for sending light into a first optical fiber, an electrooptical receiver for detecting light received through a second optical fiber and means for determining an output value indicative of a state of an optical section between the transmitter and the receiver, the master device is adapted to produce a synchronization event at its signal output terminal and each sensor device is adapted to detect a synchronization event occurring at its signal input terminal, to time an activity of the transmitter based on this synchronization event and to provide at its signal output terminal a synchronization event delayed by a predetermined offset time with respect to the detected synchronization event, wherein a property of the synchronization events provided by the sensor devices is indicative of the output value determined by the respective sensor device and diodes are connected between the signal output terminals of the sensor devices and a signal line of the bus which is connected to a signal input terminal of the master device, so that the synchronization events provided by the sensor devices are transmitted to the master device, and the master device comprises means for extracting the output values of the sensor devices from these synchronization events.

2. Optical sensor system according to claim 1, wherein each sensor device is connected to an individual segment of the bus, and each bus segment comprises segments of the bus lines and a segment of the signal daisy chain, delimited by input side connection terminals at one end and by output side connection terminals at the other end, sensor side connection terminals mated with the connection terminals of the sensor device, and the diode associated with the respective sensor device, which is connected between the sensor side connection terminal mated with the signal output terminal of the sensor device and the signal line segment of the bus segment.

3. Optical sensor system according to claim 1, wherein the master device comprises a serial data interface, preferably an IO-Link interface, for its connection to a user system and is adapted to transmit commands from the user system to the sensor devices and to transmit sensor output values to the user system by means of the serial data interface.

4. Optical sensor system according to claim 1, the sensor devices further comprising an enclosure of generally cuboid outer shape, with two opposite lateral sides and with further sides connecting the lateral sides, the enclosure is attached to a mounting rail at one of the further sides, so that the lateral sides are perpendicular to the longitudinal direction of the rail, and the signal input terminal, the signal output terminal and one or more power supply terminals are connection terminals of a connector arranged at one of the further sides of the enclosure.

5. Optical sensor system according to claim 4, wherein the synchronization events are electrical pulses and the length of the synchronization pulse produced by the sensor device is indicative of the determined output value.

6. Optical sensor system according to claim 4, wherein the sensor devices have at least two distinct modes of operation, including a system mode for operation in a sensor system and a stand-alone mode for stand-alone operation, and the optical activity of the transmitter is timed based on the detected synchronization event in system mode and based on timing events generated by an internal timing unit in stand-alone mode.

7. Optical sensor system according to claim 6, wherein the sensor devices are operable to provide at the output terminal a signal containing the produced synchronization events in system mode and a DC signal indicative of the determined output value in stand-alone mode.

8. Optical sensor system according to claim 4, wherein each sensor device is connected to an individual segment of the bus, and each bus segment comprises segments of the bus lines and a segment of the signal daisy chain, which are delimited by input side connection terminals at one end and by output side connection terminals individually associated with the input side connection terminals at the other end, and sensor side connection terminals mated with the connection terminals of the respective sensor device, wherein the input side connection terminals are arranged with respect to the output side connection terminals so that the output side connection terminals are matable with connection terminals of an identical, further bus segment corresponding to their associated input side connection terminals.

9. Optical sensor system according to claim 8, wherein the diodes are connected between the output side connection terminal of the daisy chain segment and the signal line segment of the respective bus segment.

10. Optical sensor system according to claim 8, wherein the bus segments further comprise an enclosure of generally cuboid outer shape, with two opposite lateral sides and with further sides connecting the lateral sides, and the sensor side connection terminals are contact members of a plug connector which is arranged between the lateral sides, directed towards one of the further sides and aligned with an opening at the one further side, through which the plug connector is accessible for and mated with a complementary plug connector of the connected sensor device.

11. Optical sensor system according to claim 10, wherein the bus segments comprise a coupling ring rotatably arranged in alignment with the plug connector and radially protruding into windows provided in enclosure walls forming the lateral sides of the bus segment enclosure, so that it is grippable by a user between thumb and index finger in the area of the windows, and the coupling ring is provided with coupling means configured to be engaged by rotation of the coupling ring with corresponding coupling means of the connector of the connected sensor device.

12. Optical sensor system according to claim 10, wherein the input side connection terminals are male plug contacts protruding from a lateral side of the enclosure of the respective bus segment, guide pins protrude from the same lateral side parallel to the plugging direction of the plug contacts and beyond the ends of the same, and holes shaped to accommodate the guide pins of an identical, further bus segment are provided in alignment with the guide pins at the opposite lateral side.

13. Optical sensor system according to claim 10, wherein the enclosures of the sensor devices and of the bus segments to which the enclosures are connected have adjacent, opposed further sides.

* * * * *